Aug. 19, 1969 D. G. TIPOTSCH 3,462,227
WAVELENGTH PROGRAMMED MONOCHROMATOR DEVICE WITH ADJUSTABLE
ENTRANCE AND EXIT CAM OPERATED SLIT MEANS FOR PROVIDING
A VARIABLE PROPORTIONALITY FACTOR BETWEEN THEIR WIDTHS
Filed May 11, 1966

INVENTOR.
DONALD G. TIPOTSCH
BY Paul R. Harder
ATTORNEY

United States Patent Office 3,462,227
Patented Aug. 19, 1969

3,462,227
WAVELENGTH PROGRAMMED MONOCHROMATOR DEVICE WITH ADJUSTABLE ENTRANCE AND EXIT CAM OPERATED SLIT MEANS FOR PROVIDING A VARIABLE PROPORTIONALITY FACTOR BETWEEN THEIR WIDTHS
Donald George Tipotsch, Sunnyvale, Calif., assignor to Beckman Instruments, Inc., a corporation of California
Filed May 11, 1966, Ser. No. 549,358
Int. Cl. G01j 3/12
U.S. Cl. 356—100         2 Claims

ABSTRACT OF THE DISCLOSURE

There is illustrated and described a mechanical system whereby the slit program of a monochromator in a radiant energy analyzer may be multiplied by a proportionality factor. A slit cam is coupled to the wavelength drive and the slits of a monochromator and is programmed to provide constant energy as a function of wavelength. Interposed between the slit cam and the slits is a clutch mechanism and a second exponential cam which allows the slit width to be multiplied by any desired proportionality factor. The clutch mechanism allows the relative position of the exponential cam to be varied in relation to the slit cam to provide the proportionality factor.

---

This invention relates to radiant energy analyzers and more particularly to radiant energy analyzers having slit systems programmed as a function of wavelength.

For various reasons the width of the entrance and exit slits of a radiant energy analyzer monochromator may be varied. Two primary reasons for such adjustment exist in such analyzers; first, the radiant energy source does not generally provide a constant amount of energy over the entire wavelength range of the instrument; and, secondly, both the efficiency and the resolution of the dispersing element in the monochromator also vary as a function of wavelength. Since monochromator slit width affects both the total intensity of the radiant energy reaching the detector and the overall resolution of the analyzer, by appropriate programming of the monochromator slits as a function of wavelength the nonlinearity due to variations in source energy as a function of wavelength and variations in resolution of the monochromator may be compensated.

In many instances it has been the practice in the prior art to provide a slit cam located on the wavelength drive shaft. The slit cams has cut thereon a slit width program which controls the width of the slits as a function of wavelength to provide the aforementioned compensation. In some instances is it desirable to change this slit program by a constant proportionality factor. One known method of providing prior art multi-slit programs has utilized a plurality of slit cams having the desired slit programs cut thereon. The follower arm was changed from one cam to another to select the desired program.

Figure 1:
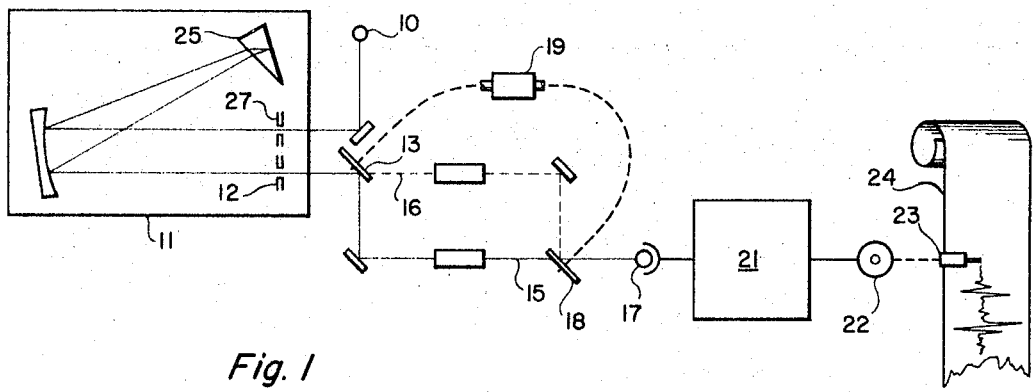
Figure 2:
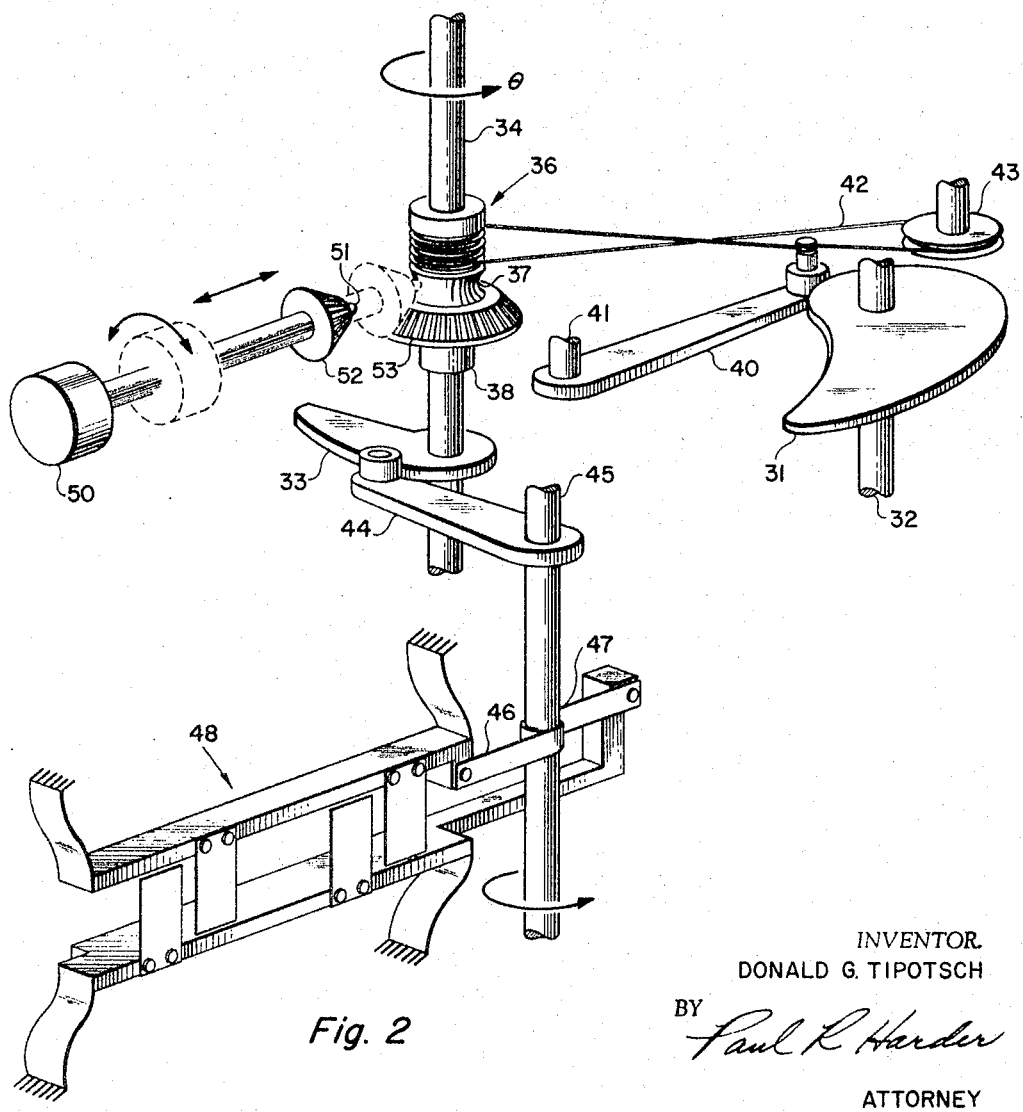

FIG. 1 illustrates a radiant energy analyzer of the type having a variable width slit monochromator; and FIG. 2 illustrates a mechanical mechanism for providing a selectable, continuous proportionality factor between the slit width programmed on the slit cam and the actual slit width.

Referring now to FIG. 1 radiation from source 10 is dispersed in monochromator 11 and directed through exit slot 12 to a rotating half mirror 13 which switches the radiation alternatively along a reference beam path 15 and a sample beam path 16. Radiation passing the reference and sample beam paths is recombined along a common path to detector 17 by a second rotating half mirror 18 driven in synchronism with beam switching mirror 13 by motor 19. The output of detector 17 is applied to any suitable measuring circuit 21 which provides an output that is a function of the intensity of the radiation transmitted by the sample. Circuit 21 may be an electronic ratioing circuit having an output connected to recorder pen drive motor 22 utilized to drive pen 23 to provide a recording on chart 24 of the transmittance of the sample as a function of wavelength. The chart 24 is driven in synchronism with the wavelength scanning mechanism utilized to drive the dispersing element in monochromator 11, illustrated in FIG. 1 as prism 25. Entrance slit 27 may be mechanically coupled to exit slit 12 and varied as a function of wavelength by any suitable slit width programmer which, in the prior art, has commonly been a cam coupled to the wavelength drive shaft.

FIG. 2 illustrates an energy multiplier mechanism for a mechanical slit system which provides a continuously selectable proportionality factor between the actual slit width and the programmed slit width. That is, if the slit width $w$ is programmed to be a function of wavelength, i.e., $$w = (f)\lambda \qquad (1)$$

then by constructing the analyzer after the teachings of this invention the slit program may be continuously multiplied by any desired factor such that the slit width now may be represented by the equation:

$$w = p(f)\lambda \qquad (2)$$

where $p$ is any number. In the practical embodiment it may be desirable to provide a proportionality factor $p$ which is less than 1 through a range where $p$ is greater than 1, for example, 3. By narrowing the slits from the normal slit program and utilizing a long scanning time maximum resolution can be achieved while widening the slits beyond normal slit program provides the higher energy levels needed for differential sample analysis and attenuated total reflectance measurements.

The wavelength cam 31 is fixed to the wavelength drive shaft 32 which is driven by any suitable wavelength scan drive motor, not shown. Wavelength drive shaft 32 is coupled to the dispersing element within the monochromator to rotate the dispersing element through a scanning angle. Slit cam 31 is shaped to provide constant background energy at the detector over the entire wavelength range of the instrument. In order to provide a continuously adjustable proportionality factor in the mechanical slit program arrangement of FIG. 2, an exponential or log cam 33 is affixed to and rotates with shaft 34. Also mounted on shaft 34 is a clutch 36 having a spool section 37 and a driven section 38. Drive cable 42 is wrapped about spool 37 and idler 43 and is affixed to the end of follower arm 40 which has its other end mounted for rotation about pivot 41. As function cam 31 is rotated by the wavelength drive shaft 32, cam follower arm 40 pivots about 41 and rotates shaft 34 by virtue of the drive cable 42 wrapped about clutch spool 37. As will be more fully explained hereinafter such an arrangement is provided to insure sufficient slit variation to cover the energy variation over the wavelength range. Typically, a slit variation of several decades may be required over the wavelength range.

A second cam follower arm 44 is provided which rotates shaft 45 as a function of rotation of exponential cam 33. By appropriate arrangement such as by flexible bands 46 and 47 wrapped about shaft 45 in opposite directions and connected to the variable slit mechanism 48 the slit jaws may be moved in opposite directions as shaft 45 rotates since one band is let out while the other is taken up.

To provide for selecting the continuously variable proportionating factor knob 50 may be pushed inwardly until pin 51 engages spool section 37 and bevel gear 52 engages bevel gear 53 which is formed as part of the driven portion 38 of clutch 36. By rotating knob 50 in either direction driven section 38 of clutch 36 may be rotated with respect to driven section 37. This positions exponential cam 33 relative to slit cam 31 and any portion of the exponential cam 33 may be selected for operation of the slits over the wavelength range. This provides a continuously variable proportioning factor between the actual slit width and the width programmed on cam 31. Exponential cam 33 may be provided with a slope proportional to its total lift R such that the $$dr/d\theta = KR$$

Thus it maintains a selectable proportionating factor between the actual slit width and the programmed slit width for any position of clutch 36.

Let it be assumed that it is desirable to vary the slit width 0.5 cm. over the wavelength range of the instrument and that wavelength drive shaft 32 rotates 330° over this range. The desired slit program will be cut over 330° of slit cam 31. Follower arm 40 moves 30° as programmed cam 31 moves 330° and if arm 40 is five times the radius of spool 37, then shaft 34 has a rotation of 150°. If exponential cam 33 is a four decade exponential cam having a lift of 75° per decade then two decades of slit variation with an angular variation of 30° for arm 40 may be provided. By appropriate selection of arm 44 and the slit mechanism, slits 48 may be made to move 0.5 cm. for two decades of rotation of log cam 33. It should be apparent that as wavelength drive shaft rotates through 330° of movement the slits 48 will move 0.5 cm. If the slits are arranged to vary between limits from 0 to 1.0 cm. over the entire four decade range of exponential cam 33, by rotation of this cam relative to the slit program function cam 31 by means of clutch 36 it is apparent that any 0.5 cm. range between 0 and 1.0 cm. may be selected. No variation in the program over the scanning range of the instrument occurs but the mechanism provides for a selection of proportionating factors.

The use of the exponential cam provides a relatively inexpensive slit system which may be adapted to various scanning speeds at fixed signal-to-noise ratio, various resolving powers at fixed signal-to-noise ratio or may be varied for differential work with a wide latitude in solvent and/or sample absorbence. By providing a fixed program over the slit range from a minimum of zero to a maximum of one centimeter great versatility of the instrument is provided.

Obviously many modifications and variations of the present invention are possible in light of the foregoing teachings and it is to be understood that the invention may be practiced otherwise than as specifically described without departing from the spirit and scope of this invention as defined by the appended claims.

What is claimed is:

1. A radiant energy analyzer comprising:
   a radiant energy source;
   a radiant energy detector;
   means providing a beam path from said source to said detector;
   means for supporting a sample in said beam path;
   a monochromator in said beam path, said monochromator including at least one energy controlling slit means and wavelength scanning means for varying the wavelength of radiant energy in said beam path;
   slit width program means coupled to said wavelength scanning means and providing a slit width program as a function of wavelength;
   log cam means coupled to said energy controlling slit means for varying the slit width;
   means associated with said log cam means for changing the position of said log cam means with respect to said slit width program means whereby the actual slit width may be multipled by a proportionality factor over the entire slit program; and
   means coupled to said detector for measuring the energy transmitted by a sample.

2. A radiant energy analyzer comprising:
   a source of radiant energy;
   a radiant energy detector;
   means providing a beam path from said source to said detector;
   means for supporting a sample in said beam path;
   a monochromator in said beam path, said monochromator including at least one energy controlling slit means and wavelength scanning means for varying the wavelength of the radiant energy in said beam path;
   slit program means coupled to said wavelength scanning means and providing a slit width program as a function of wavelength;
   log cam means coupled to said energy controlling slit means for varying the width of said slit means;
   clutch means coupling said log cam means to said slit width program means, said clutch means having a first portion rotatable with respect to a second portion;
   means coupled to one of said portions for rotating said portion with respect to the other of said portion thereby changing theposition of said log cam means with respect to said slit width program means whereby the actual slit width may be multiplied by a proportionality factor over the entire slit program; and
   means coupled to said detector for measuring the en- energy transmitted by said sample.

References Cited

UNITED STATES PATENTS

| | | |
|---|---|---|
| 2,654,287 | 10/1953 | Luft. |
| 3,009,390 | 11/1961 | Gale _____ 350—271 |
| 3,098,408 | 7/1963 | Cary _____ 350—271 |
| 3,144,498 | 8/1964 | Alpert et al. |
| 3,160,697 | 12/1964 | Jacobs et al. |

JAMES W. LAWRENCE, Primary Examiner

V. LAFRANCHI, Assistant Examiner

U.S. Cl. X.R.

250—226, 237; 350—271